Nov. 3, 1936.   W. C. JOHNSON   2,059,584
PROCESS OF MAKING COMPOSITE METAL
Filed July 12, 1935
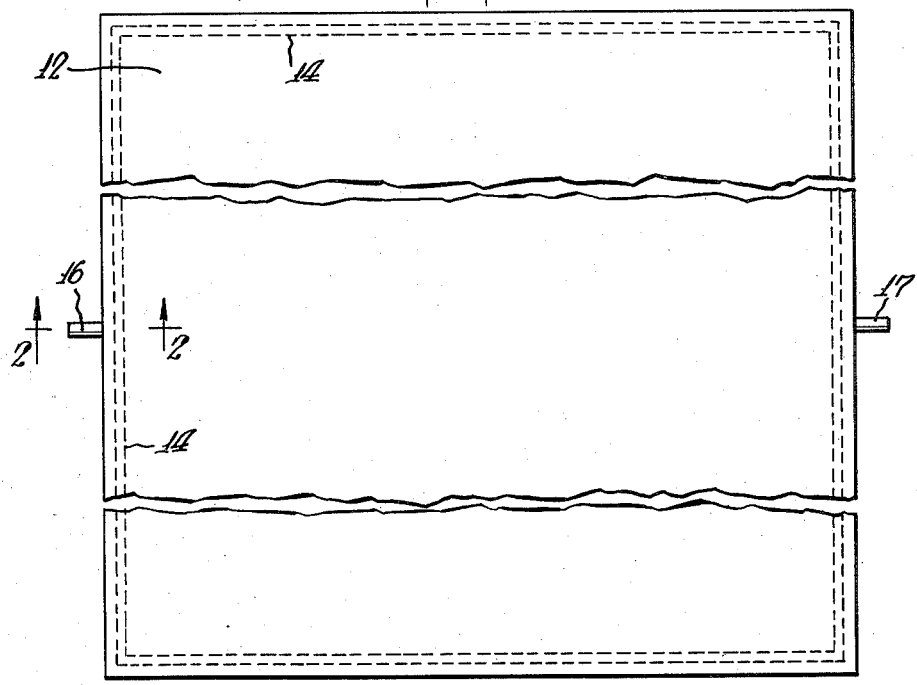
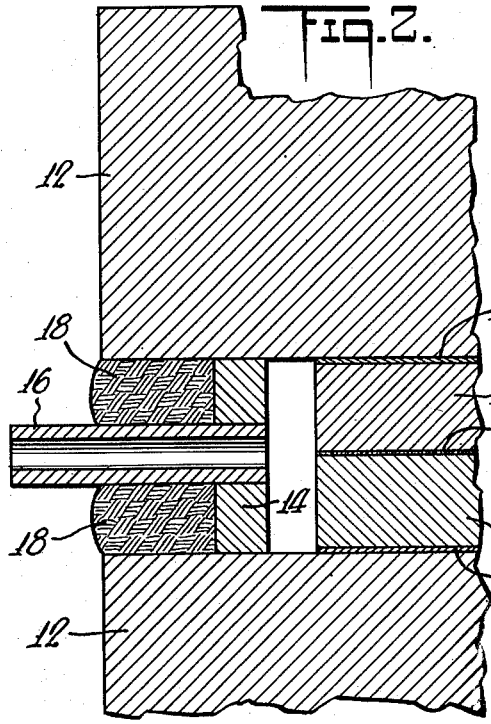
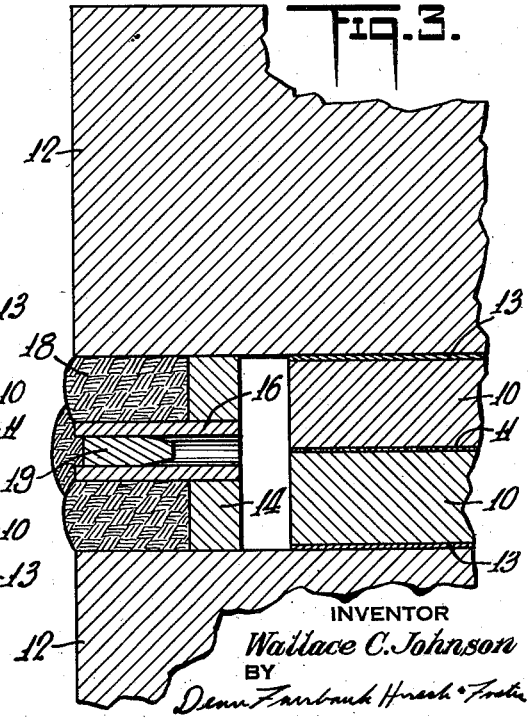
INVENTOR
Wallace C. Johnson
BY
Dean Fairbank Hirsch & Foster
ATTORNEYS Patented Nov. 3, 1936

2,059,584

UNITED STATES PATENT OFFICE 2,059,584

PROCESS OF MAKING COMPOSITE METAL

Wallace C. Johnson, Orange, N. J., assignor to The Plykrome Corporation, New York, N. Y., a corporation of Delaware Application July 12, 1935, Serial No. 30,981

4 Claims. (Cl. 29—189)

In the process of making a plate having a corrosion resistant or stainless steel veneer, in accordance with the Maskrey Patent 1,896,411, issued February 7, 1933, a backing slab of mild steel and a plate of corrosion resistant metal are assembled in superposed relationship with an intermediate bond or flux sheet preferably of comparatively pure iron. The composite slab so formed is then heated and rolled down to the desired thickness to weld the sheets together along their contacting surfaces.

In the commercial practice of the Maskrey process, it is usual to place two backing slabs of mild steel on opposite sides of two corrosion resistant plates, the latter being separated by a layer of non-oxidizing and non-carbonizing lubricant to prevent them from adhering during heating and rolling, as disclosed and claimed in my prior Patent 1,886,615, issued November 8, 1932.

Although the processes of those patents have been in commercial use for some time and in most cases a satisfactory weld has been effected throughout the entire areas of the juxtaposed steel and corrosion resistant sheets, it has been noted that in some instances unwelded areas or "blisters" have occurred. Many unsuccessful efforts have been made to find the cause of and prevent the occurrence of such blisters.

It is my opinion that these unwelded areas or blisters are caused by the formation of chromium or iron oxides between the stainless steel veneer and the iron bond sheet or steel base, and that these oxides are formed during the heating of the assembled layers previous to the rolling operation. Although the surfaces are substantially flat and lie close together, I believe that a small amount of the air may be trapped between the slightly irregular surfaces and there is some in the expansion space formed between the sealing bars and the edges of the veneer sheets. The mere removal of the air by suction, with the corresponding creation of a partial vacuum between the sheets and in the expansion space, has not proved satisfactory in overcoming the trouble. This may be due to breaks or the creation of fissures in the seal around the composite slab during the heating and rolling operation, which would permit the flow of air or furnace gas into these vacuum spaces or voids.

One object of the present invention is to provide a process in which a more satisfactory welding of the superposed sheets of a composite slab is effected.

Another object is to provide a process for forming a composite plate in which the welded contacting surfaces and edges are free from the formation of oxides creating blisters and the like.

I have discovered that the objects can be secured and the said defects overcome by replacing all of the air between the outer sheets of a composite slab by an inert gas, thereby preventing foreign gases from entering between the superposed sheets during the application of heat and pressure in welding together the contacting surfaces of the sheets. An inexpensive and effective way of accomplishing this air replacement is to provide the sealing bars with an inlet and outlet, and to force inert gas, such as nitrogen, through the inlet to scavenge the air from between the outer sheets and force it out through the outlet, the flow of the inert gas being continued until all of the air has been forced out from between the outer sheets of the slab and replaced by the inert gas. The inlet and outlet may then be sealed and the composite slab subjected to the usual heating and rolling action to weld the sheets thereof together.

In this process, if fissures, cracks or any leaks are developed in the seal between the outer sheets of the composite slab, the expansion of the heated inert gases will cause the escape of these gases through these cracks or fissures, thereby preventing the passage of air or furnace gas inwardly into the spaces between the outer sheets of the composite slab.

In the accompanying drawing, there is shown for the purpose of illustration, one form in which the present invention may be carried out. In the drawing:—

Fig. 1 is a top plan view of a composite slab ready for the introduction of inert gas therein, Fig. 2 is a section taken on the line 2—2 of Fig. 1, and Fig. 3 is a section similar to Fig. 2, but after the slab has been sealed and prior to the heating and rolling operation.

In carrying out my invention, I assemble a composite slab in a manner similar to that disclosed in my prior Patent No. 1,886,615, issued November 8, 1932. For that purpose, a pair of veneer sheets 10 made of a corrosion resistant alloy, such as stainless steel, chrome steel, chrome iron, chrome nickel, molybdenum steel and the like, are superposed with a suitable non-oxidizing and non-carbonizing lubricant 11 therebetween to prevent these sheets from adhering during heating and rolling.

On the outside of the two corrosion resistant sheets I mount a pair of backing sheets 12 preferably of mild steel. These sheets are separated from their adjoining corrosion resistant plates 10 by a thin intermediate bond sheet 13 preferably of comparatively pure iron which will aid in the operation of welding the corrosion resistant plates to the mild steel plates. Other bond or flux sheets may be used under certain circumstances, such as a sheet made of ferrous copper alloy, pure copper or pure nickel steel, or a metallic coating or layer may be formed on one surface by electro chemical deposition from a solution. In cases where the backing sheets 12 are of comparatively pure iron, I may dispense with the use of a bond or flux sheet.

In order to provide for relative expansion between the sheets, resulting from differences in coefficient of expansion thereof, the corrosion resistant sheets 10 are cut smaller than the backing sheets 12 so that the edges of these veneer sheets are spaced inwardly from the edges of said backing sheets. The backing sheets 12 are secured together by bars 14 preferably of steel, inserted between said sheets adjacent to the edges thereof, and welded to said sheets but not to the veneer sheets 10. The bars 14 serve to hold all of the sheets together during heating and rolling operation, and to seal the edges of the outer backing sheets so as to prevent admission of foreign gases therebetween during heating and rolling operation. These bars 14 when welded in position are spaced at such a distance from the edges of the veneer sheets 10 as to permit free linear expansion of these latter sheets.

As an example of the general dimensions of a composite slab commercially formed, the outer steel sheets 12 may each be 60 inches by 80 inches by 3 inches. The corrosion resistant sheets 10 may each be about ¾ of an inch thick, and are of such linear dimensions as to leave an expansion space of about ⅜ of an inch from the inner sides of the union bars 14 to the edges of the veneer sheets 10.

In order to effect the replacement of the air from between the outer backing sheets 12, I provide an inlet and outlet opening for the expansion space. For that purpose I provide an inlet nipple 16 and an outlet nipple 17 which, in the specific commercial form shown, would be about ¼ of an inch in diameter and 2 inches long, these nipples passing through the union bars 14 and into the interior of the space on opposite sides of the composite slab, and being held by the welding 18 which holds the bars 14. After the composite slab has been formed, as already disclosed, and before it is subjected to the heating and rolling action, a suitable inert gas such as nitrogen is forced through the inlet nipple 16 at a pressure which, in the commercial form shown, would be approximately 10 pounds, this inert gas scavenging the air between the outer backing sheets 12 and forcing it through the outlet nipple 17. The inert gas is forced in between the outer sheets for about one minute or until all of the air has been forced out. After that, a lighted taper may be held in front of the outer end of the outlet nipple 17 to indicate whether or not air is still emerging from said outlet nipple.

After all of the air has been exhausted from between the outer sheets 12, a plug may be inserted in the outlet nipple 17, while the admission of inert gas through the nipple 16 is continued until the gas pressure between the outer backing sheets 12 is about equal to the pressure of the incoming inert gas (i. e. about 10 pounds in the commercial form described). This steel plug may then be removed, permitting more inert gas to escape from the outlet nipple, and to carry with it any trace of air that might have remained in the composite slab. While the inert gas is still escaping through the outlet nipple 17, the plug is again inserted in the outlet nipple and driven in tightly so as to stop any further escape of inert gas therethrough. The admission of inert gas at the inlet nipple 16 is then discontinued and a tapered steel plug 19 is driven tightly into said nipple as shown in Fig. 3, and similar to the plug above referred to. The ends of the nipples 16 and 17 are then cut off so that they do not extend beyond the general contour of the composite slab, and welds are made over the ends of the two plugs so as to permanently seal the openings of these nipples. The composite slab so formed can then be heated and rolled in a manner described in my previous patent referred to. For some cases it may be desirable to only drive in the steel plugs and not weld them gas-tight. Thus during the rolling the trapped inert gas between the veneer and the base may force its way out.

By the term "inert gas" I mean one which will not act in any way to oxidize the iron, chromium or any other ingredients of the metallic surfaces with which it comes in contact. In some cases it may be desirable to suck out the air through the outlet nipple so as to create a partial vacuum before admitting the nitrogen or other inert gas through the inlet nipple.

I have discovered that regardless of the exact cause of the trouble heretofore encountered in securing complete and uniform surface welding, such trouble is entirely overcome by the process above described.

Having thus described my invention, what I claim as new and desire to secure by Letters Patent is:—

1. The process of making composite metal plates having corrosion resistant facings, which includes the steps of forming a stack in which a pair of corrosion resistant sheets are disposed between two backing sheets, said corrosion resistant sheets being smaller than the backing sheets so that the edges of said corrosion resistant sheets are spaced inwardly from the corresponding edges of said backing sheets, forming a weld between the edges of said backing sheets to hold said backing sheets against relative displacement and to form an expansion space around said corrosion resistant sheets, scavenging all of the air trapped between said backing sheets by an inert gas, sealing said inert gas between said backing sheets, and applying heat and pressure to weld together the contacting surfaces of the sheets throughout their areas.

2. The process of making a composite plate having a corrosion resistant surface, which includes the steps of assembling in superposed relationship a metal backing sheet and a sheet of corrosion resistant metal, forming a seal around said sheets with an inlet and outlet opening, forcing inert gas through said inlet to scavenge the air trapped between said sheets and force it through said outlet until all of the air has been replaced by inert gas, sealing said inlet and outlet opening, and applying heat and pressure to weld together the contacting surfaces of the sheets throughout their areas.

3. The process of making composite metal plates having corrosion resistant facings, which includes the steps of forming a stack in which a pair of corrosion resistant sheets are disposed between two backing sheets, said corrosion resistant sheets being smaller than the backing sheets so that the edges of said corrosion resistant sheets are spaced inwardly from the corresponding edges of said backing sheets, welding together the edges of said backing sheets to hold said backing sheets against relative displacement and to form an expansion space around said corrosion resistant sheets to permit said latter sheets to expand linearly, replacing all of the air between said backing sheets by an inert gas, sealing said inert gas between said backing sheets, and applying heat and pressure to weld together the contacting surfaces of the sheets throughout their areas.

4. The process of making a composite metal having a corrosion resistant surface, which includes the steps of assembling in superposed relationship a metallic backing slab and a plate of corrosion resistant material, removing the air from between them by the application of a suction, delivering an inert gas between the plate and slab, and applying heat and pressure to weld together the contacting surfaces of the plate and slab.

WALLACE C. JOHNSON.